UNITED STATES PATENT OFFICE.

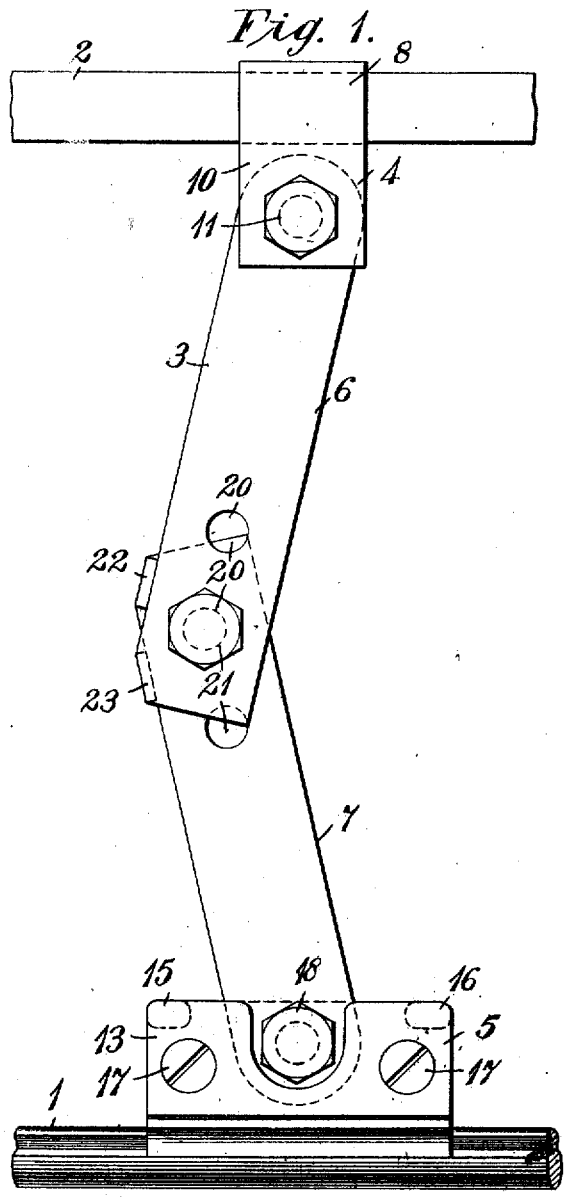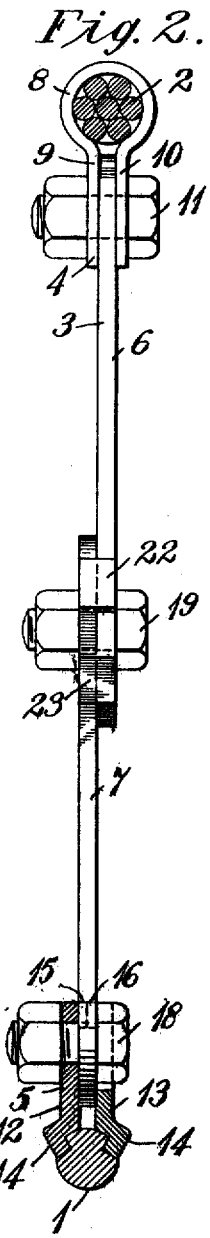

THEODORE VARNEY, OF PITTSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

TROLLEY-HANGER.

No. 931,356.	Specification of Letters Patent.	Patented Aug. 17, 1909.

Application filed March 9, 1908. Serial No. 420,077.

*To all whom it may concern:*

Be it known that I, THEODORE VARNEY, a citizen of the United States, and a resident of Pittsburg, in the county of Allegheny and State of Pennsylvania, have invented a new and useful Improvement in Trolley-Hangers, of which the following is a specification.

My invention relates to overhead line structures for electric railways, and it has for its object to provide an improved device for suspending a trolley conductor from a messenger wire or cable.

In the catenary type of line suspension, as usually installed, the trolley wire is connected to the messenger cable by a plurality of rigid hangers, each of which comprises a rod and a pair of clamps to respectively engage the cable and the trolley conductor. By reason of the rigid nature of the above-mentioned connections, undesirable results are liable to follow any relative longitudinal movement between the trolley conductor and the cable; for example, the trolley conductor is sometimes kinked or bent out of shape near the ends of the trolley clamps. Furthermore, when electric vehicles are operated at high speeds, a relatively high pressure is usually exerted by the trolley or other current-collector against the trolley conductor in order to avoid arcing and to insure contact between the engaging parts.

In the use of the rigid hangers of the prior art, the points of connection between the hanger and the trolley conductor have been so unyielding that a material hammering action took place under certain conditions as the trolley contact shoe passed along the wire, which served to bend the trolley wire at these points and to increase the arcing tendency.

According to my present invention, I provide a hanger which is simple and durable in construction and is adapted to prevent torsional movement of the trolley wire and to obviate the tendency for the trolley wire to bend or kink when its hanger is not vertical. Moreover, the difficulties of the prior art are largely overcome by permitting a vertical movement of the trolley wire and a longitudinal movement of the trolley wire relative to the messenger cable, as well as a vertical adjustment of the hanger itself. A special advantage is secured by entirely avoiding a frictional engagement between the cable and the pivoted links of the hangers, and wear on the cable from other causes.

Figure 1 of the accompanying drawings is a side elevation of a hanger constructed in accordance with my invention, and Fig. 2 is a partially sectional elevation at right angles to that of Fig. 1.

Referring to the drawings, a trolley wire 1 is suspended from a messenger wire or cable 2 by means of hangers 3. Each hanger 3 comprises a cable clamp 4, a trolley clamp 5 and a pair of links 6 and 7 interposed between the two clamps.

The cable clamp 4 comprises a loop 8 having a pair of ears 9 and 10 to which one end of the link 6 is pivotally connected by means of a bolt 11.

The trolley clamp 5 may be of any suitable construction and comprises, as shown, a pair of clamping jaws 12 and 13 having hooked extremities 14 which engage suitable grooves in the trolley conductor, and spacing lugs 15 and 16 which project inwardly from opposite outer corners of the jaw members. The jaw members are secured to the trolley by binding screws 17 which produce a clamping action between the jaws. The lower end of the link 7 projects into the space between the jaw members which is provided by the spacing lugs 15 and 16, and is pivotally secured to the jaw member 12 by means of a bolt 18.

It will be observed that the arrangement of parts is such as to permit a vertical or a longitudinal adjustment of the trolley conductor while a torsional movement is prevented.

A hinge connection is established between the links 6 and 7 by means of a bolt 19 which extends through corresponding holes 20 and 21 in the links, several holes being provided near the end of each link in order to adapt the hanger to different distances between the trolley conductor and the messenger cable.

If the two links are allowed to come into absolute alinement with each other so that the bolts 11, 18 and 19 lie in the same straight line, one of the advantages of the hanger is defeated and, consequently, lateral projections 22 and 23 are provided at corresponding adjacent corners of the links to form stops which limit the separation between the messenger and the trolley conductor.

The nuts on the bolts 11, 18 and 19 are so set as to restrict the movement of the trolley wire toward and away from the cable in order to maintain a good contact with a trolley shoe by materially resisting its upward pressure, without making the structure rigid.

It will be understood that modifications in the size and arrangement of parts may be effected in the hanger illustrated without departing from the spirit and scope of my invention.

I claim as my invention:

1. A hanger for electric lines comprising two clamping members and two hinge-connected links which are respectively hinge-connected to said clamping members.

2. A hanger for electric lines comprising two clamping members, two hinge-connected links, and means for preventing an absolute alinement of the links.

3. A hanger for electric lines comprising a pair of clamping or securing members, two hinge-connected links interposed between the clamping members and having lateral projections for preventing alinement of the links.

4. In an electric line structure, the combination with a messenger wire or cable, and a trolley conductor, of means for supporting the trolley conductor from the cable comprising a trolley clamp, a cable clamp and a pair of links pivotally connected to each other and respectively connected to the clamps.

5. In an electric line structure, the combination with a messenger wire or cable, a trolley conductor and two rigid hinge-connected links for suspending the trolley conductor from the cable, of means for varying the combined length of the links.

6. In an electric line structure, the combination with a messenger cable, a trolley wire, and clamps fastened to said wire and to said cable, respectively, a pair of links hinge-connected together and to the respective clamps to move only in the plane of the wire and cable.

In testimony whereof, I have hereunto subscribed my name this 25th day of February, 1908.

THEODORE VARNEY.

Witnesses:
E. ERNEST ROSE,
BIRNEY HINES.